(12) United States Patent
Li et al.

(10) Patent No.: US 12,395,645 B2
(45) Date of Patent: Aug. 19, 2025

(54) METHOD FOR DETECTING REGION OF INTEREST IN IMAGE, VIDEO ENCODING METHOD, APPARATUSES, COMPUTER DEVICE, STORAGE MEDIUM, AND COMPUTER PROGRAM PRODUCTS

(71) Applicant: Glenfly Tech Co., Ltd., Shanghai (CN)

(72) Inventors: Jinjing Li, Shanghai (CN); Chuanchuan Zhu, Shanghai (CN); Jin Shao, Shanghai (CN)

(73) Assignee: Glenfly Tech Co., Ltd., Shanghai (CN)

( * ) Notice: Subject to any disclaimer, the term of this patent is extended or adjusted under 35 U.S.C. 154(b) by 18 days.

(21) Appl. No.: 18/642,491

(22) Filed: Apr. 22, 2024

(65) Prior Publication Data

US 2025/0240435 A1    Jul. 24, 2025

(30) Foreign Application Priority Data

Jan. 22, 2024 (CN) .......................... 202410091176.6

(51) Int. Cl.
| | | |
|---|---|---|
| *H04N 7/12* | (2006.01) | |
| *H04N 19/119* | (2014.01) | |
| *H04N 19/124* | (2014.01) | |
| *H04N 19/137* | (2014.01) | |
| *H04N 19/14* | (2014.01) | |
| *H04N 19/167* | (2014.01) | |
| *H04N 19/176* | (2014.01) | |

(52) U.S. Cl.
CPC ......... *H04N 19/167* (2014.11); *H04N 19/119* (2014.11); *H04N 19/124* (2014.11); *H04N 19/137* (2014.11); *H04N 19/14* (2014.11); *H04N 19/176* (2014.11)

(58) Field of Classification Search
CPC .................................................... H04N 19/167
See application file for complete search history.

(56) References Cited

FOREIGN PATENT DOCUMENTS

| CN | 104079934 A | 10/2014 |
| CN | 113706573 A | 11/2021 |
| CN | 114222121 A | 3/2022 |

OTHER PUBLICATIONS

Office Action in Chinese Patent Application CN2024100911766 with English translation, mailed Mar. 26, 2025, (18 pages).

*Primary Examiner* — Young Lee
(74) *Attorney, Agent, or Firm* — NIXON PEABODY LLP

(57) ABSTRACT

The present disclosure relates to a method for detecting a region of interest in an image, a video encoding method, apparatuses, a computer device, a storage medium, and a computer program product. The method includes: obtaining a current to-be-detected image frame, determining a mapping block size parameter value from encoding parameters corresponding to the current to-be-detected image frame, dividing the current to-be-detected image frame to obtain multiple mapping blocks based on the mapping block size parameter value, performing a texture region detection on each mapping block to obtain a texture region of interest detection result. performing a motion region of interest detection on each mapping block to obtain a motion region of interest detection result, and determining a region of interest of the current to-be-detected image frame based on the texture region of interest detection result and the motion region of interest detection result.

20 Claims, 5 Drawing Sheets

METHOD FOR DETECTING REGION OF INTEREST IN IMAGE, VIDEO ENCODING METHOD, APPARATUSES, COMPUTER DEVICE, STORAGE MEDIUM, AND COMPUTER PROGRAM PRODUCTS

CROSS-REFERENCE TO RELATED APPLICATIONS

The present application claims priority to Chinese patent application No. 202410091176.6, filed on Jan. 22, 2024, the entire content of which is incorporated herein by reference.

TECHNICAL FIELD

The present disclosure relates to the field of image processing technologies, particularly to a method for detecting a region of interest in an image, a video encoding method, apparatuses, a computer device, a storage medium, and a computer program product.

BACKGROUND

With the rapid development of video media, there is a growing demand for higher video quality, and the video bitrate also increases exponentially, which poses a great challenge to operation platforms in terms of short-term network bandwidth costs and user viewing experience.

SUMMARY

In a first aspect, the present disclosure provides a method for detecting a region of interest in an image. In the method, a current to-be-detected image frame is obtained. A mapping block size parameter value is determined from encoding parameters corresponding to the current to-be-detected image frame, and the current to-be-detected image frame is divided based on the mapping block size parameter value to obtain multiple mapping blocks. A texture region of interest detection is performed on each mapping block to obtain a texture region detection result, and a motion region of interest detection is performed on each mapping block to obtain a motion region detection result. Based on the texture region of interest detection result and the motion region of interest detection result, a region of interest of the current to-be-detected image frame is determined.

In some embodiments, performing the texture region of interest detection on each mapping block to obtain the texture region of interest detection result includes: dividing each mapping block to obtain sub-blocks and determining a sub-block size; obtaining a first threshold adjustment factor corresponding to the current to-be-detected image frame; obtaining a quantization parameter value of the current to-be-detected image frame; determining a first initialization threshold based on the quantization parameter value of the current to-be-detected image frame and the sub-block size; and performing, based on the first initialization threshold and the first threshold adjustment factor, a region of interest detection on the sub-block to obtain the texture region of interest detection result of the mapping block.

In some embodiments, determining the first initialization threshold based on the quantization parameter value of the current to-be-detected image frame and the sub-block size includes: looking up a first mapping relationship table to determine the first initialization threshold corresponding to the quantization parameter value and the sub-block size; and when the first initialization threshold corresponding to the quantization parameter value and the sub-block size is not found in the first mapping relationship table, determining, based on quantization parameter values and sub-block sizes in the first mapping relationship table, the first initialization threshold corresponding to the quantization parameter value and the sub-block size by means of interval mapping.

In some embodiments, performing, based on the first initialization threshold and the first threshold adjustment factor, the region of interest detection on the sub-blocks to obtain the texture region of interest detection result of the mapping block includes: obtaining an edge pixel determining threshold based on the first threshold adjustment factor and the first initialization threshold; calculating edge gradient values of pixels in each of the sub-blocks; determining an edge pixel determining result of each pixel based on the edge gradient value of the pixel and the edge pixel determining threshold; determining an edge density value of the corresponding sub-block based on each edge pixel determining result; when the edge density value is greater than an edge density threshold, determining that the sub-block is the region of interest; and determining that the mapping block is the region of interest when the mapping block includes at least one sub-block that is determined as the region of interest.

In some embodiments, obtaining the first threshold adjustment factor corresponding to the current to-be-detected image frame includes: obtaining, when the current to-be-detected image frame is an initial frame, a first initialization adjustment factor as the first threshold adjustment factor; and obtaining, when the current to-be-detected image frame is not the initial frame, the first threshold adjustment factor obtained based on a quantity of mapping blocks of a region of interest and a quantity of mapping blocks of a region of non-interest in a texture region of interest detection result of a previous to-be-detected image frame.

In some embodiments, the edge gradient values of the pixels are calculated based on a Sobel edge detection.

In some embodiments, performing the motion region of interest detection on each mapping block to obtain the motion region of interest detection result of the mapping block includes: obtaining a quantization parameter value of the current to-be-detected image frame; obtaining a second threshold adjustment factor corresponding to the current to-be-detected image frame; determining second initialization thresholds of different motion vector directions based on the quantization parameter value; performing, based on the second initialization thresholds and the second threshold adjustment factor, a motion detection on at least one prediction unit corresponding to each mapping block, and calculating a total area of a motion region in each mapping block based on a motion detection result of the at least one prediction unit; and determining that the mapping block is the region of interest when a ratio of the total area of the motion region in the mapping block to an area of the mapping block is greater than a ratio threshold.

In some embodiments, determining, based on the quantization parameter value, the second initialization thresholds of different motion vector directions includes: looking up a second mapping relationship table to determine the second initialization thresholds of the different motion vector directions corresponding to the quantization parameter value; and; and when the second initialization thresholds of the different motion vector directions corresponding to the quantization parameter value are not found in the second mapping relationship table, determining, based on quantization parameter values in the second mapping table, the second initialization threshold of the different motion vector directions corresponding to the quantization parameter value by means of interval mapping.

In some embodiments, performing, based on the second initialization threshold and the second threshold adjustment factor, the motion detection on the at least one prediction unit corresponding to each mapping block, and calculating the total area of the motion region in each mapping block based on the motion detection result of the at least one prediction unit includes: determining, based on the second initialization thresholds of different motion vector directions and the second threshold adjustment factor, a motion vector threshold corresponding to each of the different motion vector directions; obtaining a mapping block at a corresponding position in the previous frame of the current to-be-detected image frame; when different direction motion vectors of at least one prediction unit included in the obtained mapping block of the previous to-be-detected image frame are all greater than the corresponding motion vector thresholds, determining that the mapping block, which has the same position as the at least one prediction unit in the obtained mapping block, of the current to-be-detected image is a motion region; and obtain the total area of the motion region in the mapping block based on the area of each prediction unit that is determined as the motion region.

In some embodiments, obtaining the second threshold adjustment factor corresponding to the current to-be-detected image frame includes: when the current to-be-detected image frame is a target initial frame, obtaining a second initialization adjustment factor as the second threshold adjustment factor; and when the current to-be-detected image frame is not the target initial frame, obtaining a second threshold adjustment factor obtained based on a ratio of an area of a motion region in a target to-be-detected image frame to an area of a motion region in the previous to-be-detected image frame, wherein the target to-be-detected image frame is the previous frame of the previous to-be-detected image frame.

In some embodiments, determining, based on the texture region detection result and the motion region detection result, the region of interest of the current to-be-detected image frame includes: determining a type of interest and an intensity of interest of each mapping block based on the texture region of interest detection result and the motion region of interest detection result of the mapping block; and obtaining the region of interest of the current to-be-detected image frame based on the type of interest and the intensity of interest of each mapping block.

In some embodiments, the type of interest includes four types, and different types of interest correspond to different intensities of interest. The type of the interest of the mapping block is a first type when both the texture region of interest detection result and the motion region of interest detection result indicate that the mapping block is the region of interest. The type of interest of the mapping block is a second type when both the texture region of interest detection result and the motion region of interest detection result indicate that the mapping block is not the region of interest. The type of interest of the mapping block is a third type when the texture region of interest detection result indicates that a mapping block is the region of interest and the motion region of interest detection result indicates that the mapping block is not the region of interest. The type of the interest of the mapping block is a fourth type when the texture region of interest detection result indicates that a mapping block is not the region of interest and the motion region of interest detection result indicates that the mapping block is the region of interest.

In some embodiments, the method further includes: outputting the region of interest of the current to-be-detected image frame to a quantization parameter value calculation module of a hardware; or outputting the region of interest of the current to-be-detected image frame to a target storage area, and the region of interest of the current to-be-detected image frame in the target storage area is transmitted to a hardware encoder through a user interface.

In a second aspect, the present disclosure further provides a video encoding method, including: obtaining a region of interest obtained based on the method for detecting a region of interest in an image according to any one of the foregoing embodiments; obtaining a quantization parameter value of a current image frame by means of calculation based on the region of interest; and performing image frame encoding based on the quantization parameter value.

In a third aspect, the present disclosure further provides an apparatus for detecting a region of interest in an image. The apparatus includes a to-be-detected image obtaining module, a mapping block division module, a texture region of interest detection module, a motion region of interest detection module, and a region of interest determining module The to-be-detected image acquiring module is configured to obtain a current to-be-detected image frame.

The mapping block division module is configured to determine a mapping block size parameter value from encoding parameters corresponding to the current to-be-detected image frame and divide, based on the mapping block size parameter value, the current to-be-detected image frame to obtain multiple mapping blocks.

The texture region of interest detection module is configured to a texture region of interest detection on each mapping block to obtain a texture region of interest detection result.

The region of motion region of interest detection module is configured to perform a motion region of interest detection on each mapping block to obtain a motion region of interest detection result.

The region of interest determining module is configured to determine a region of interest of the current to-be-detected image frame based on the texture region of interest detection result and the motion region of interest detection result.

In a fourth aspect, the present disclosure further provides a video encoding apparatus, including: a region of interest obtaining module configured to obtain a region of interest obtained by using the above apparatus for detecting a region of interest in an image; a quantization parameter value updating module configured to calculate a quantization parameter value of a current image frame based on the region of interest; and an encoding module configured to perform an image frame encoding based on the quantization parameter value.

In a fifth aspect, the present disclosure further provides a computer device, including a memory and a processor. The memory stores a computer program therein, and the processor, when executing the computer program, performs the steps of the method in any one of the foregoing embodiments.

In a sixth aspect, the present disclosure further provides a non-transitory computer readable storage medium, in which a computer program is stored. The computer program, when executed by a processor, cause the processor to perform steps of the methods in any one of the foregoing embodiments.

In a seventh aspect, the present disclosure further provides a computer program product including a computer program. The computer program, when executed by a processor, cause the processor to perform steps of the methods in any one of the foregoing embodiments.

BRIEF DESCRIPTION OF THE DRAWINGS

To describe the technical solutions in the embodiments of the present disclosure or the related technologies more clearly, the following briefly describes the accompanying drawings required for describing the embodiments or the related technologies. Apparently, the accompanying drawings in the following description show merely some embodiments of the present disclosure, and a person of ordinary skill in the art may derive other drawings from these accompanying drawings without creative efforts.

DETAILED DESCRIPTION OF THE EMBODIMENTS

Figure 1:
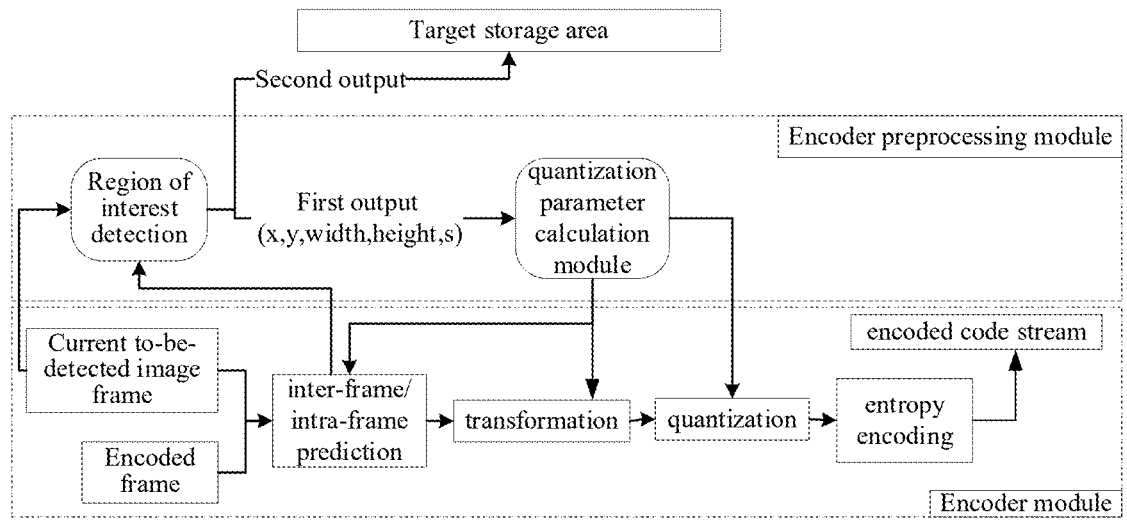
FIG. 1 is an application environment diagram of a method for detecting a region of interest in an image according to an embodiment.

In order to make the purpose, technical solution, and advantages of the present disclosure more clear and understandable, the following detailed description is given in conjunction with the accompanying drawings and embodiments. It should be understood that the specific embodiments described herein are only used to explain the present disclosure, but not to limit the present disclosure.

With the rapid development of video media, there is a growing demand for higher video quality, and the video bitrate also increases exponentially, which poses a great challenge to operation platforms in terms of short-term network bandwidth costs and user viewing experience. Faced with such challenges, continuous optimization of video encoding standards has to be performed to improve encoding efficiency. In addition to constantly introducing new encoding standards, the use of AI technologies such as region of interest encoding has become particularly important. Multiple subjective evaluations in the video market indicate that the overall subjective visual effect of the region of interest encoding is significantly improved compared with the traditional encoding method, especially in low bandwidth environments. The region of interest encoding technology can not only achieve desired high-quality images but also maintain a relatively low bitrate, which effectively resolves the contradiction between bitrate and image quality.

Video encoding based on the region of interest involves modifying bitrate allocation between the region of interest (ROI) and the region of non-interest (NON-ROI) by utilizing the existence of subjective region of interest (ROI) and the region of non-interest (NON-ROI) in the human eye. This approach allocates more bitrates to the ROI, thereby subjectively improving the video quality.

At present, many hardware products only consider hardware resources and encoding performance. Many manufacturers do not set the algorithm for detecting the region of interest in the hardware of video encoding devices. They only provide an interface that supports the region of interest encoding so that a user can set a region of interest and adjust a quantization parameter (QP) of the region of interest. Most products add the algorithm for detecting the region of interest at an upper-layer application, such as the x265 open source project (High Efficiency Video Coding (HEVC) open source encoding library), to support the region of interest encoding. The x265 open source project implements video encoding similar to the region of interest encoding by using the adaptive quantization (Aq) technology. In the Aq algorithm in the x265, an average value and a variance of 64×64, 32×32, 16×16, and 8×8 blocks are recursively calculated, so as to obtain a quantization parameter offset value (qp-delta) of an entire encoding frame in the four types of blocks. This implementation has a high requirement on hardware at both the computing complexity and storage level. At present, in the engineering community, small algorithm adjustments are made based on the original Aq algorithm in the x265, so as to achieve the purpose of supporting the region of interest in video encoding at the software application level.

In addition, a study on region of interest encoding includes perception encoding based on the human visual system (HVS), which has numerous parameters and complex models, and inaccurate model construction leads to inaccurate detection of region of interest in video frames.

A method for detecting a region of interest in an image provided in embodiments of the present disclosure may be applied to an encoder shown in FIG. 1. The encoder includes an encoder preprocessing module and an encoder module. The encoder preprocessing module pre-calculates encoding parameters for the encoder module to assist the encoding of the encoder. The encoder performs normal encoding processes for image frames, including: inputting the current image frame and the encoded image frame, performing inter-frame/intra-frame prediction, transformation, quantization, entropy encoding, and finally outputting the encoded code stream.

The method for detecting a region of interest in an image in the present disclosure is implemented by the encoder preprocessing module using corresponding hardware, and the method may be executed simultaneously with the operation of the encoder module (i.e., a formal hardware encoder). In this way, the method for detecting a region of interest in an image is implemented by the encoder preprocessing module only as a pre-analysis stage of the encoder module, the encoding processes performed by the encoder preprocessing module and the encoder module are parallel, and the encoder preprocessing module does not affect the encoding performance of the encoder module.

In this embodiment, both the encoder preprocessing module and the encoder module are hardware, in which computer program instructions are stored. The computer program instructions, when executed by a processor, cause the encoder preprocessing module and the encoder module to perform corresponding functions.

With reference to FIG. 1, the input of the hardware module corresponding to the method for detecting a region of interest in an image includes two parts: the first part is the original image data of the current to-be-detected image frame, and the second part is the motion vector generated by the current to-be-detected image frame during the inter-frame prediction process. In addition, the algorithm for detecting the region of interest in an image further needs to obtain the size of the mapping block specified in the normal encoding parameter of the encoder. The mapping block is the smallest computational unit of the method for detecting the region of interest in an image. In other words, by dividing the current to-be-detected image frame into multiple mapping blocks and then determining whether each mapping block is a region of interest, the region of interest of the current to-be-detected image frame is obtained. The method for detecting a region of interest in an image takes the mapping block size as the input parameter, supporting different block sizes of 128, 64, 32, and 16, meeting and being compatible with the variable block-based encoding form of the current mainstream video encoding standards.

Detecting whether each mapping block in the current to-be-detected image frame is a region of interest takes into account both the motion attribute of the current to-be-detected image frame and the static texture attribute of the current to-be-detected image frame, so that the region of interest in the current to-be-detected image frame can be accurately detected. In addition, in the method, a first initialization threshold and a second initialization threshold are obtained based on the input quantization parameter (Qp) of the encoded frame by looking up a table, realizing that different quantization parameters (Qp) index different first initialization thresholds and second initialization thresholds. Moreover, the first initialization threshold and the second initialization threshold can be adaptively adjusted according to encoding information of the current to-be-detected image frame, and this adaptive performance ensures the correctness of the detection of the region of interest of the current to-be-detected image frame.

The texture region of interest detection on the mapping block can be achieved by using the Sobel gradient operator combined with threshold determination, and the motion region of interest detection on the mapping block can be achieved by using the motion vector combined with threshold determination. In this way, the image processing algorithm based on the Sobel operator only involves multiplication and addition operations between pixel values of an input video frame and the Sobel operator, making it relatively simple to implement. The detection of the motion region of the video frame based on the motion vector (MV) information of the coded frame can be realized by simply caching these data, making the algorithm implementation less complex.

With continued reference to FIG. 1, the final output data of the method for detecting the region of interest is the region of interest of the current to-be-detected image frame. In some embodiments, the form of the output data may be as follows: (x, y, width, height, $s_{roi}$), where (x, y) represents coordinates of a pixel at an upper left point of the region of interest, width represents the width of the rectangular region of interest, height represents the height of the rectangular region of interest, and $s_{roi}$ represents the intensity of interest of the region of interest and used to instruct and constrain the calculation of the quantization parameter (Qp) offset value (Qp-delta).

In an embodiment, the output manner of the region of interest may include at least one of the following: directly outputting to a quantization parameter calculation module of a hardware encoder; outputting to a target storage area, for example, writing to an external memory, so that the region of interest can be transmitted to another hardware encoder that supports the encoding of the region of interest as an input through a user interface.

In an embodiment, the encoder module runs in parallel with the encoder preprocessing module, and the encoder module is configured to perform image encoding. Specifically, the encoding method includes: obtaining a region of interest obtained by using the method for detecting a region of interest in an image; calculating a quantization parameter value of the current image frame based on the region of interest; and encoding the image frame based on the quantization parameter value.

The encoder may be applied to any terminal or server to implement video encoding. The terminal may be, but is not limited to, various personal computers, laptops, smartphones, tablets, Internet of Things devices, and portable wearable devices. The Internet of Things device may be a smart speaker, a smart television, a smart air conditioner, a smart in-vehicle device, etc. The portable wearable device may be a smart watch, a smart wristband, a head-mounted device, etc. The server may be implemented as a single server or a server cluster composed of multiple servers.

Figure 2:
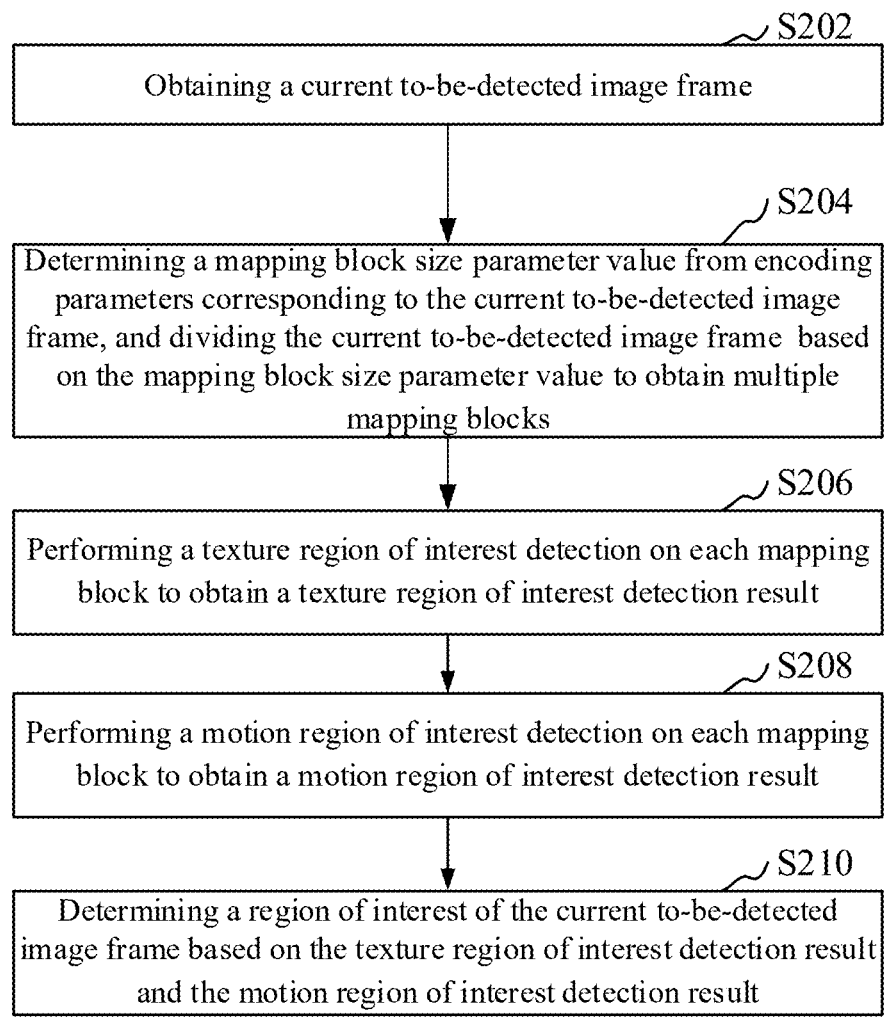
FIG. 2 is a schematic flowchart of a method for detecting a region of interest in an image according to an embodiment.

In an exemplary embodiment, as shown in FIG. 2, a method for detecting a region of interest in an image is provided. Taking the method applied to the encoder preprocessing module in FIG. 1 as an example, the method includes the following steps S202 to S210.

In step S202, a current to-be-detected image frame is obtained.

The current to-be-detected image frame is the current frame in the video, which may be considered as the next frame to be coded.

In step S204, a mapping block size parameter value is determined from encoding parameters corresponding to the current to-be-detected image frame, and the current to-be-detected image frame is divided based on the mapping block size parameter value to obtain multiple mapping blocks.

The mapping block size parameter value is included in the parameters for normal encoding of the encoder, and the mapping block is the smallest computational unit of the method for detecting a region of interest in an image. For example, if the region of interest encoding is used in an encoding process, the size of a mapping block is set through encoding parameters so that the mapping block size parameter value can be directly obtained from the encoding parameters. In some embodiments, the mapping block size parameter value may include, but is not limited to, 128 pixels×128 pixels, 64 pixels×64 pixels, 32 pixels×32 pixels, and 16 pixels×16 pixels.

The encoder preprocessing module divides the current to-be-detected image frame based on the mapping block size parameter value to obtain multiple mapping blocks, and the division may be started from the pixel in the upper left corner of the current to-be-detected image frame.

In step S206, a texture region of interest detection is performed on each mapping block to obtain a texture region of interest detection result.

In step S208, a motion region of interest detection is performed on each mapping block to obtain a motion region of interest detection result.

In the time domain, the motion region of a video image can particularly attract people's attention. In the space domain, the edge information and the regions with complex textures in a video image can attract more attention. Therefore, in the present disclosure, the texture region of interest detection and the motion region of interest detection are performed on each mapping block, so as to determine whether each mapping block is a region of interest. The texture region of interest detection result is the result of whether the mapping block is a region of interest determined based on the texture. The motion region of interest detection result is the result of whether the mapping block is a region of interest determined based on the motion detection.

The texture region of interest detection on the mapping block may be performed using a Sobel gradient operator combined with a threshold determination. In other embodiments, other texture region of interest detection operators may also be used.

The motion region of interest detection on the mapping block may be performed using a motion vector combined with a threshold determination. In other embodiments, other motion detection manners may also be used.

The initial value of the threshold involved in the texture region of interest detection and the motion region of interest detection may be obtained by looking up a table based on a quantization parameter of the encoder and adaptively adjusted during an encoding process, so as to ensure the accuracy of the texture region of interest detection result and the motion region of interest detection result.

In step S210, based on the texture region of interest detection result and the motion region of interest detection result, a region of interest of the current to-be-detected image frame is determined.

The encoder preprocessing module obtains, based on the texture region of interest detection result and the motion region of interest detection result, the result of whether each mapping block is the region of interest, and obtains the region of interest of the current to-be-detected image frame according to all mapping blocks that are determined as the region of interest.

In an embodiment, determining the region of interest of the current to-be-detected image frame based on the texture region of interest detection result and the motion region of interest detection result includes: determining a type of interest and an intensity of interest of each mapping block based on the texture region of interest detection result and the motion region of interest detection result of the mapping block; and obtaining the region of interest of the current to-be-detected image frame based on the type of interest and the intensity of interest of each mapping block.

The types of interest may be predefined. In an embodiment, based on different detection methods, the types of interest are set to include four different types. In other embodiments, the number of types of interest may be set to other values. The number of interest types is not limited herein. In this embodiment, based on the texture region of interest detection method and the motion region of interest detection method, the types of interest are set to include four different types, referring to Table 1.

The intensities of interest are set for different types of interest. Different types of interest correspond to different intensities of interest, and the values of the intensities of interest may be preset. A person skilled in the art may set different values for the intensity of interest according to requirements.

TABLE 1

| Type of interest | $S_{roi}$ | Conditions satisfied by the mapping block |
|---|---|---|
| 0 | 6 | mapping block ∈ texture region of interest, and mapping block ∈ motion region of interest |

TABLE 1-continued

| Type of interest | $S_{roi}$ | Conditions satisfied by the mapping block |
|---|---|---|
| 1 | 3 | mapping block ∈ texture region of interest |
| 2 | 2 | mapping block ∈ motion region of interest |
| 3 | −2 | region of non-interest |

According to Table 1, when both the texture region of interest detection result and the motion region of interest detection result indicate that a mapping block is a region of interest, the type of interest of the mapping block is determined as a first type, e.g., represented by 0, and the intensity of interest of the mapping block is 6. When both the texture region of interest detection result and the motion region of interest detection result indicate that a mapping block is not a region of interest, the type of interest of the mapping block is determined as a second type, e.g., represented by 3, and the intensity of interest is −2. When the texture region of interest detection result indicates that a mapping block is a region of interest and the motion region of interest detection result indicates that the mapping block is not a region of interest, the type of interest of the mapping block is determined as a third type, e.g., represented by 1, and the intensity of interest is 3. When the texture region of interest detection result indicates that a mapping block is not a region of interest and the motion region of interest detection result indicates that the mapping block is a region of interest, the type of interest of the mapping block is determined as a fourth type, e.g., represented by 2, and the intensity of interest is 2.

In this way, based on Table 1, the region of interest detection algorithm outputs data as follows: (x, y, width, height, $s_{roi}$).

In an embodiment, an output manner of the output data (x, y, width, height, $s_{roi}$) of the region of interest detection algorithm includes at least one of the following: outputting the region of interest corresponding to the current to-be-detected image frame to a quantization parameter value calculation module of hardware; or outputting the region of interest corresponding to the current to-be-detected image frame to a target storage area, and the region of interest corresponding to the current to-be-detected image frame in the target storage area is transmitted to the hardware encoder through a user interface.

When the encoder module is configured with a quantization parameter value calculation module, the encoder preprocessing module outputs the detection result of the region of interest to the quantization parameter value calculation module of the encoder module, so as to generate the quantization parameter offset value required by the encoder module.

In another method, the encoder preprocessing module outputs the detection result of the region of interest to the target storage area, such as an external memory, and transmits the detection result of the region of interest to another hardware encoder that supports the region of interest encoding through a user interface.

In the foregoing method for detecting the region of interest in an image, after a current to-be-detected image frame is acquired, a mapping block size parameter value is obtained from encoding parameters corresponding to the current to-be-detected image frame, and multiple mapping blocks are obtained by dividing the current to-be-detected image frame based on the mapping block size parameter value. Then, a texture region of interest detection is respectively performed on each mapping block to obtain a texture region of interest detection result, and a motion region of interest detection is performed on each mapping block to obtain a motion region of interest detection result. Finally, a region of interest corresponding to the current to-be-detected image frame is determined according to the texture region of interest detection result and the motion region of interest detection result. Both the motion attribute of the image frame and the static texture attribute of the image frame are taken into account, so that the region of interest of the to-be-detected image frame can be accurately detected.

Figures 3, 4:
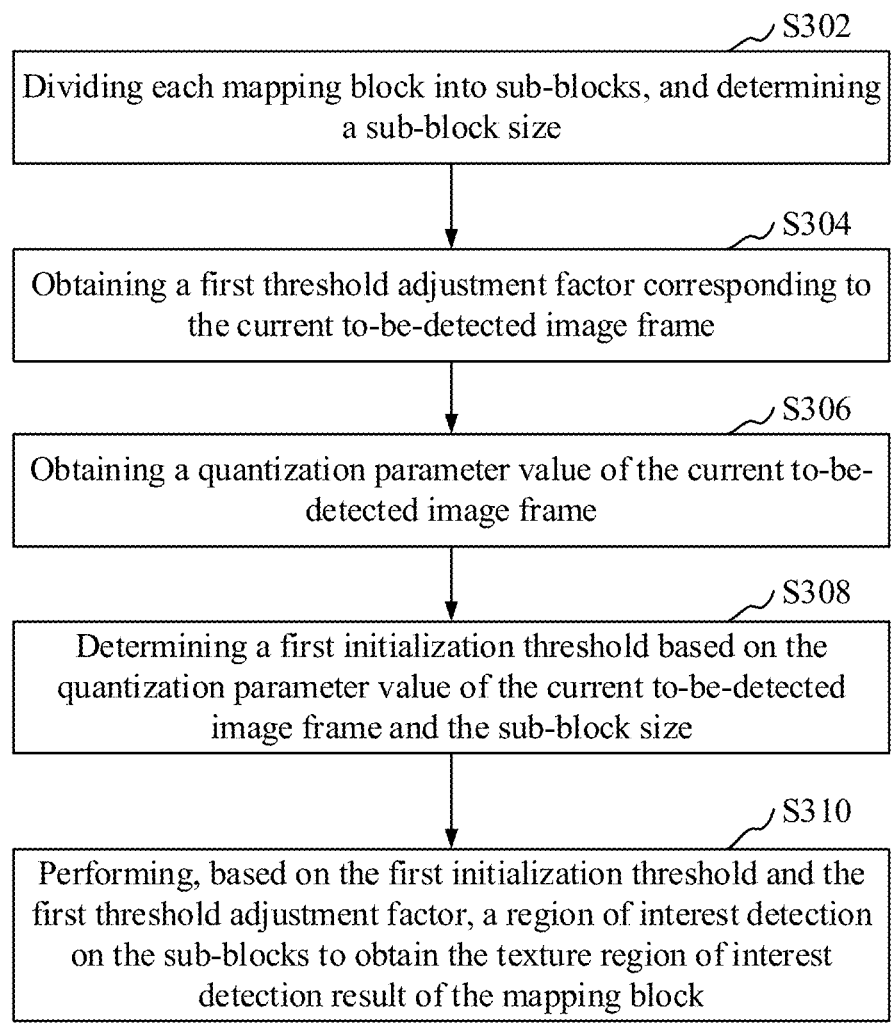
FIG. 3 is a flowchart of a texture region of interest detection step according to an embodiment.
FIG. 4 is a schematic diagram showing relative positions of pixels in Sobel operator gradient calculation according to an embodiment.

In an embodiment, with reference to FIG. 3, which shows a flowchart of a texture region of interest detection step according to an embodiment, the texture region of interest detection step, i.e., performing the texture region of interest detection on each mapping block to obtain the texture region of interest detection result, includes the following steps S302-S310.

In step S302, each mapping block is divided into sub-blocks, and a sub-block size is determined.

The sub-blocks are obtained by dividing the mapping block. Each mapping block is divided into A pieces of sub-blocks. In an embodiment, A is equal to 4. In other embodiments, A may have other values. However, if the value of A is greater than 4, the implementation cost of the hardware is greater. By dividing the mapping block into a plurality of sub-blocks, the complexity of the texture of the block can be detected at a smaller block granularity, thereby determining the size of the region with complex textures within the entire mapping block.

After the mapping block is divided, the size of each sub-block is obtained based on the size of the mapping block and the number of sub-blocks. For example, assuming that the mapping block is divided into four sub-blocks, if the size of the mapping block is 128 pixels×128 pixels, the corresponding size of each sub-block is 64 pixels×64 pixels. Similarly, if the size of the mapping block is 64 pixels×64 pixels, the size of each sub-block is 32 pixels×32 pixels. If the size of the mapping block is 32 pixels×32 pixels, the size of each sub-block is 16 pixels×16 pixels. If the size of the mapping block is 16 pixels×16 pixels, the size of each sub-block is 8 pixels×8 pixels.

In step S304, a first threshold adjustment factor corresponding to the current to-be-detected image frame is obtained.

The first threshold adjustment factor is configured for adjusting a first initialization threshold, and an initial value of the first threshold adjustment factor is 1. Subsequently, a first threshold adjustment factor corresponding to a next to-be-detected image frame is calculated based on the quantity of the mapping blocks in the texture region of interest in the current to-be-detected image frame and the quantity of the mapping blocks in the non-texture region of interest of the to-be-detected image frame, and the first threshold adjustment factor corresponding to the next to-be-detected image frame is stored so as to be used in the texture region of interest detection for the next to-be-detected image frame.

In an embodiment, obtaining the first threshold adjustment factor corresponding to the current to-be-detected image frame includes: obtaining, when the current to-be-detected image frame is the initial frame, a first initialization adjustment factor as the first threshold adjustment factor; and obtaining, when the current to-be-detected image frame is not the initial frame, the first threshold adjustment factor obtained based on the quantity of the mapping blocks of the region of interest and the quantity of the mapping blocks of the region of non-interest in the texture region of interest detection result of the previous to-be-detected image frame.

In other words, when the current to-be-detected image frame is the initial frame, i.e., the first frame to be coded, the first threshold adjustment factor is the first initialization adjustment factor, i.e., 1. When the current to-be-detected image frame is not the first frame, the generated first threshold adjustment factor is obtained. Specifically, the method for calculating the first threshold adjustment factor is as follows:

$$\theta_{sobel} = \frac{f(n)_{n-block-non-roi}}{f(n)_{n-block-roi}} \quad (1)$$

A video encoding sequence includes multiple encoding frames, i.e., to-be detected image frames. In the above formula, n represents the index of an encoding frame in the encoding sequence, $f(n)_{n-block-roi}$ represents the quantity of mapping blocks detected as regions of interest in the encoding frame n, and $f(n)_{n-block-roi}$ represents the quantity of mapping blocks detected as the regions of non-interest in the encoding frame n.

After the first threshold adjustment factor $\theta_{sobel}$ is calculated, it is stored for generating a threshold for determining the edge pixel of a next encoding frame.

In step S306, a quantization parameter value of the current to-be-detected image frame is obtained.

The quantization parameter value is obtained from an image parameter set of the current to-be-detected image frame and is used for the encoding of the region of interest.

In step S308, a first initialization threshold is determined based on the quantization parameter value of the current to-be-detected image frame and the sub-block size.

The first initialization threshold is used for edge pixel determining and can be obtained by inputting the quantization parameter value and the sub-block size, for example, by looking up a table based on the quantization parameter value and the sub-block size.

In an embodiment, determining the first initialization threshold based on the quantization parameter value of the current to-be-detected image frame and the sub-block size includes: looking up a first mapping relationship table to determine the first initialization threshold corresponding to the quantization parameter value and the sub-block size; when the first initialization threshold corresponding to the quantization parameter value and the sub-block size is not found in the first mapping relationship table, determining the first initialization threshold corresponding to the quantization parameter value and the sub-block size based on the quantization parameter values and the sub-block sizes in the first mapping relationship table by means of interval mapping.

In this embodiment, the first initialization threshold $Thr_{Qp,N}$ used for detecting the texture region of interest is obtained by looking up the table based on the quantization parameter QP of the video frame and the sub-block size N. Typical values of the quantization parameter Qp include 24, 28, 32, and 36. Other values may also be used in other embodiments. The sub-block size N is the size of the divided sub-block. The typical values of the sub-block size N include 8, 16, 32, and 64, and other values may also be used in other embodiments.

Table 2 to Table 5 are the tables recording the relationship between quantization parameters QP, sub-block sizes N, and first initialization thresholds $Thr_{Qp,N}$. Table 2 is the relationship table between quantization parameters QP and first initialization thresholds $Thr_{Qp,N}$ when N=8. Table 3 is the relationship table between quantization parameters QP and first initialization thresholds $\text{Thr}_{Qp,N}$ when N=16. Table 4 is the relationship table between quantization parameters QP and first initialization thresholds $\text{Thr}_{Qp,N}$ when N=32. Table 5 is the relationship table between quantization parameters QP and first initialization thresholds $\text{Thr}_{Qp,N}$ when N=64.

TABLE 2

| N = 8 | |
|---|---|
| Qp | $\text{Thr}_{QP,N}$ |
| 24 | 18 |
| 28 | 30 |
| 32 | 45 |
| 36 | 50 |

TABLE 3

| N = 16 | |
|---|---|
| Qp | $\text{Thr}_{QP,N}$ |
| 24 | 30 |
| 28 | 80 |
| 32 | 100 |
| 36 | 120 |

TABLE 4

| N = 32 | |
|---|---|
| Qp | $\text{Thr}_{QP,N}$ |
| 24 | 50 |
| 28 | 100 |
| 32 | 130 |
| 36 | 160 |

TABLE 5

| N = 64 | |
|---|---|
| Qp | $\text{Thr}_{QP,N}$ |
| 24 | 100 |
| 28 | 120 |
| 32 | 180 |
| 36 | 220 |

The tables of the first initialization thresholds used for edge determination are obtained by adding Sobel edge detection code to the official HM (HEVC (high efficiency video coding) Test Model) of the HEVC standard and after a lot of encoding tests. Table 2 to Table 5 provide only the first initialization threshold values corresponding to commonly used quantization parameters (Qp). The first initialization threshold values corresponding to the quantization parameters that are not in the tables can be obtained by means of interval mapping. For example, when an input quantization parameter Qp is 22, which is less than the QP value 24, the first initialization threshold corresponding to the Qp value 24 can be obtained as the first initialization threshold corresponding to the QP value 22.

In step S310, based on the first initialization threshold and the first threshold adjustment factor, a region of interest detection is performed on the sub-blocks to obtain the texture region of interest detection result of the mapping block.

In an embodiment, based on the first initialization threshold and the first threshold adjustment factor, performing the region of interest detection on each sub-block to obtain the texture region of interest detection result of the mapping block includes: obtaining an edge pixel determining threshold based on the first threshold adjustment factor and the first initialization threshold; calculating edge gradient values of pixels in each of the sub-blocks; determining an edge pixel determining result of each pixel based on the edge gradient value of the pixel and the edge pixel determining threshold; determining an edge density value of the corresponding sub-block based on each edge pixel determining result; determining that the sub-block is the region of interest when the edge density value is greater than an edge density threshold; and determining that the mapping block is the region of interest when the mapping block includes at least one sub-block that is the region of interest.

The detection of the region of interest may include a step of calculating the edge gradient value of the pixel, a step of performing edge pixel determining based on the edge gradient value of the pixel, the first initialization threshold, and the first threshold adjustment factor, a step of obtaining the edge density based on the edge pixel determining result, and a step of performing the texture region of interest detection based on the edge density.

The step of calculating the edge gradient value of the pixel is mainly to calculate the edge gradient $A_{i,j}$ of the pixel $P(i,j)$ in the N×N sub-block. Assuming that $P(i,j)$ is the pixel value of the position (i, j) in the N×N sub-block, the formulas for calculating the gradient values in the horizontal direction and the vertical direction in the Sobel edge detection are as follows, respectively:

$$E_{i,j}^h = p_{i+1,j-1} + 2*p_{i+1,j} + p_{i+1,j+1} - (p_{i-1,j-1} + 2*p_{i-1,j} + p_{i-1,j+1}) \quad (2)$$

$$E_{i,j}^v = p_{i-1,j+1} + 2*p_{i,j+1} + p_{i+1,j+1} - (p_{i-1,j-1} + 2*p_{i,j-1} + p_{i+1,j-1}) \quad (3)$$

where $0 \le i,j < N$, and $E_{i,j}^h$ and $E_{i,j}^v$ represent the gradient values of the pixel p(i,j) in the horizontal direction and the vertical direction, respectively. The relative positions $p_{i+1,j-1}$, $p_{i+1,j}$, $p_{i+1,j+1}$, $p_{i-1,j-1}$, $p_{i-1,j}$, $p_{i-1,j+1}$, $p_{i,j+1}$, $p_{i,j-1}$, etc., of the pixels that participate in the Sobel gradient value calculation may be referred to as shown in FIG. 4, which are pixel values of adjacent pixels of the pixel p(i,j).

FIG. 4 is a schematic diagram showing the relative positions of pixels in the Sobel operator gradient calculation according to an embodiment. The gradient value at the position (i,j) can be defined by the following formula:

$$A_{i,j} = |E_{i,j}^h| + |E_{i,j}^v| \quad 0 \le i, j < N \quad (4)$$

where the value of N may be 8, 16, 32, or 64.

The step of edge pixel determining is performed based on the edge gradient value of the pixel, the first initialization threshold, and the first threshold adjustment factor, i.e., performing a threshold determining on the calculated edge gradient value of the pixel and the product of the first initialization threshold and the first threshold adjustment factor. In other words, the edge density values $ED_{x,y}$ of the four N×N sub-blocks in the current to-be-detected mapping block are calculated by determining the relationship between $A_{i,j}$ and $\theta_{sobel}*\text{Thr}_{QP,N}$:

$$EP_{i,j} = \begin{cases} 1 & \text{if } A_{i,j} > \theta_{sobel} * Thr_{QP,N} \\ 0 & \text{otherwise} \end{cases} \quad (5)$$

$$ED_{x,y} = \frac{\sum_{i=0}^{N} \sum_{j=0}^{N} EP_{i,j}}{N \times N} (0 \le x, y \le 1)$$

where $Thr_{QP,N}$ is the first initialization threshold obtained by querying the table based on the quantization parameter (Qp) and the size N of an input divided sub-block, and $\theta_{sobel}$ is the first threshold adjustment factor, and the initial value of $\theta_{sobel}$ is 1.

The step of obtaining the edge density based on the edge pixel determining result is to perform a threshold determining on the edge density value $ED_{x,y}$ of the N×N sub-block, so as to determine whether the N×N sub-block is the region of interest. Specifically, the following formula may be used to determine whether the sub-block is the region of interest:

$$block_{x,y} = \begin{cases} 1, & ED_{x,y} > \alpha, \alpha = 0.08 \\ 0, & \text{otherwise} \end{cases} \quad (6)$$

where $block_{x,y}$ represents the sub-block, and $\alpha$ is an edge density threshold of the N×N sub-block. Based on experience, the detection effect of the sub-block is in line with expectations when $\alpha$ is set to 0.08. The value of $\alpha$ is obtained by adding the Sobel detection algorithm to the HM soft encoder as described above and running different encoding instances. In general, users do not need to change the value of $\alpha$ during usage. For high-demand scenarios, users can obtain a proper value of $\alpha$ based on their encoding instances.

The step of performing texture region of interest detection based on the edge density includes: defining the current detected mapping block as the region of interest when one of the N×N sub-blocks is the region of interest:

$$block = \begin{cases} \text{region of interest } ROI, & \text{sum}(block_{x,y}) > 1 \\ \text{region of non-interest } NON-ROI, & \text{otherwise} \end{cases} \quad (7)$$

In the above embodiment, the first initialization threshold is obtained by looking up the table based on the input quantization parameter (Qp) of the current to-be-detected image frame, achieving that different quantization parameters (Qp) index different first initialization thresholds, and the first initialization threshold can be adaptively adjusted according to the encoding information of the current to-be-detected image frame. This adaptivity ensures that the region of interest of the current to-be-detected image frame is detected correctly. In addition, the image processing algorithm based on the Sobel operator only involves multiplication and addition operations between pixel values of the current to-be-detected image frame and the Sobel operator, which is relatively simple to implement.

Figure 5:
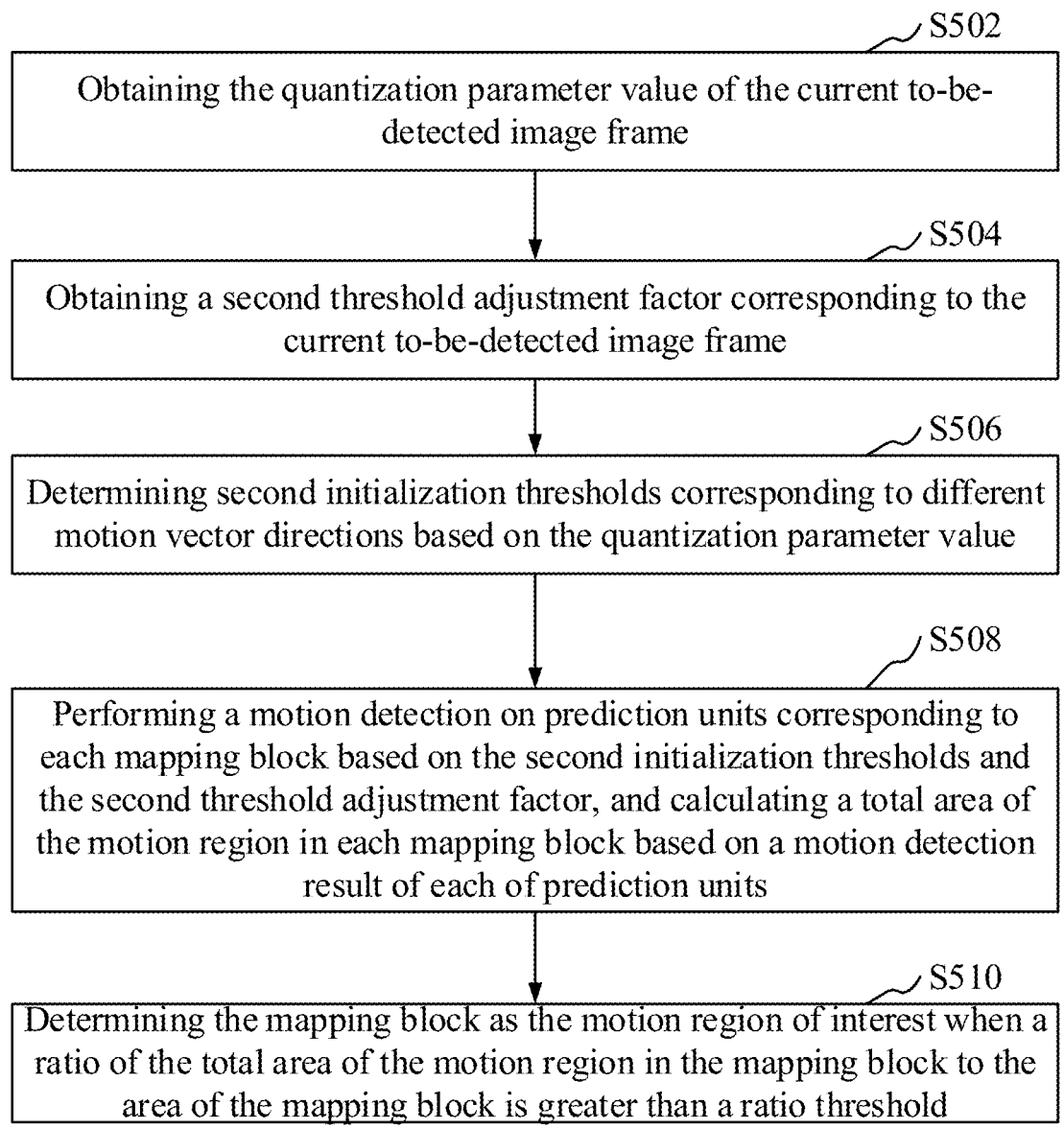
FIG. 5 is a flowchart of a motion region of interest detection step according to an embodiment.

In an embodiment, with reference to FIG. 5, which shows a flowchart of a motion region of interest detection step according to an embodiment, the motion region of interest detection step, i.e., performing the motion region of interest detection on each mapping block to obtain the motion region of interest detection result of the mapping block, includes the following steps S502-S510:

In step S502, the quantization parameter value of the current to-be-detected image frame is obtained.

The quantization parameter value is obtained from the image parameter set of the current to-be-detected image frame and is used for the region of interest encoding.

Both the step of detecting the texture region of interest and the step of detecting the motion region of interest involve obtaining the quantization parameter value, therefore, for convenience, the quantization parameter value may be obtained from the image parameter set of the current to-be-detected image frame into a memory at one time, enabling direct access for subsequent use.

In step S504, a second threshold adjustment factor corresponding to the current to-be-detected image frame is obtained.

The second threshold adjustment factor is configured for adjusting a second initialization threshold, and an initial value of the second threshold adjustment factor is 1. Subsequently, a second threshold adjustment factor of a next to-be-detected image frame is calculated based on the quantity of mapping blocks in the motion region of interest in the current to-be-detected image frame and the quantity of mapping blocks in the motion region of interest in the previous to-be-detected image frame, and the second threshold adjustment factor corresponding to the next to-be-detected image frame is stored so as to be used in the motion region of interest detection for the next to-be-detected image frame.

In an embodiment, obtaining the second threshold adjustment factor corresponding to the current to-be-detected image frame includes: obtaining a second initialization adjustment factor as the second threshold adjustment factor when the current to-be-detected image frame is a target initial frame; and when the current to-be-detected image frame is not the target initial frame, obtaining the second threshold adjustment factor obtained based on a ratio of an area of a motion region in a target to-be-detected image frame to an area of a motion region in the previous to-be-detected image frame, the target to-be-detected image frame being the previous frame of the previous to-be-detected image frame.

Specifically, when the current to-be-detected image frame is the target initial frame, i.e., the first frame to be coded, the second frame to be coded, and the third frame to be coded, the second threshold adjustment factor is the second initialization adjustment factor, i.e., 1. When the current to-be-detected image frame is not the target initial frame, the ratio of the area of the motion region in the target to-be-detected image frame to the area of the motion region in the previous to-be-detected image frame is used as the second threshold adjustment factor, and the target to-be-detected image frame is the previous frame of the previous to-be-detected image frame. Specifically, the formula for calculating the second threshold adjustment factor $\theta_{pu-moving}$ is as follows:

$$\theta_{pu-moving} = \begin{cases} 1, & n = 0, 1, 2 \\ \frac{f(n-2)_{area-moving}}{f(n-1)_{area-moving}} & n > 2 \end{cases} \quad (8)$$

where $f(n-1)_{area-moving}$ represents an area of a motion region in the previous frame (frame n−1) of the current to-be-detected image frame (frame n), and $f(n-2)_{area-moving}$ represents an area of a motion region in the frame (frame n−2) that is two frames before the current to-be-detected image frame (frame n).

After the second threshold adjustment factor $\theta_{pu-moving}$ is calculated, it is stored for the calculation of the subsequent motion region.

In step S506, second initialization thresholds corresponding to different motion vector directions are determined based on the quantization parameter value.

A motion vector represents the offset vector of the macroblock in the video frame with respect to the corresponding reference block in the reference frame. In the 2D video encoding, a motion vector typically includes two motion vector directions: the horizontal direction and the vertical direction.

The second initialization thresholds are used for determining the motion region and can be obtained by looking up a table based on the motion vector and the quantization parameter.

In an embodiment, determining the second initialization thresholds corresponding to different motion vector directions based on the quantization parameter value includes: looking up a second mapping relationship table to determine the second initialization thresholds of different motion vector directions corresponding to the quantization parameter value; when the second initialization thresholds of different motion vector directions corresponding to the quantization parameter value are not found in the second mapping relationship table, determining the second initialization thresholds of different motion vector directions corresponding to the quantization parameter value based on the quantization parameter values in the second mapping relationship table by means of interval mapping.

In this embodiment, the second initialization thresholds $Thr_{mv.x}$ and $Thr_{mv.y}$ of different motion vector directions used for detecting the motion region of interest are obtained by looking up the table based on the quantization parameter QP of the video frame and the motion vectors. Typical values of the quantization parameter Qp include 24, 28, 32, and 36. Other values may also be used in other embodiments.

Table 6 shows a mapping relationship between second initialization thresholds, quantization parameters QP, and two vector directions MV.x and MV.y of a motion vector (MV). Specifically, Table 6 is as follows:

TABLE 6

| Qp | $Thr_{mv \cdot x}$ | $Thr_{mv \cdot y}$ |
|---|---|---|
| 24 | 64 | 64 |
| 28 | 72 | 72 |
| 32 | 76 | 76 |
| 36 | 88 | 88 |

Table 6 provides only second initialization threshold data corresponding to commonly used encoding quantization parameters Qp. For a quantization parameter Qp that is not in Table 6, the corresponding second initialization threshold data may be obtained in a manner of comparing interval sizes. For example, when the encoding quantization parameter Qp is 22, which is less than the Qp value of 24, the second initialization threshold corresponding to the Qp value of 24 can be obtained as that corresponding to the Qp value of 22.

In step S508, a motion detection is performed on at least one prediction unit corresponding to each mapping block based on the second initialization thresholds and the second threshold adjustment factor, and a total area of the motion region in each mapping block is calculated based on a motion detection result of the at least one prediction unit. Each mapping block defines at least one prediction unit, and each prediction unit corresponds to a motion vector, which represents the change in position of the prediction unit with respect to its corresponding reference block.

In an embodiment, performing the motion detection on the at least one prediction unit corresponding to each mapping block based on the second initialization thresholds and the second threshold adjustment factor, and calculating the total area of the motion region in each mapping block based on the motion detection result of the at least one prediction unit includes: determining, based on the second initialization thresholds of the different motion vector directions and the second threshold adjustment factor, a motion vector threshold corresponding to each of the different motion vector directions; obtaining the mapping block at the corresponding position in the previous to-be-detected image frame of the current to-be-detected image frame; when different direction motion vectors of the at least one prediction unit included in the obtained mapping block of the previous to-be-detected image frame are all greater than the corresponding motion vector thresholds, determining that the mapping block, which has the same position as the at least one prediction unit in the obtained mapping block, of the current to-be-detected image frame is a motion region; and obtaining the total area of the motion region in the mapping block based on the area of each prediction unit that is determined as the motion region.

Determining the motion region in the mapping block includes determining whether the corresponding prediction units in the mapping block are motion regions. The motion vectors (MV) of all prediction units (pu) contained in the mapping block at the same location (co-located) in the coded previous to-be-detected image frame are compared with the motion vector thresholds to determine whether the prediction unit (pu) is a motion region. The motion vector threshold is obtained based on the second initialization threshold and the second threshold adjustment factor, i.e., based on the product of the second initialization threshold and the second threshold adjustment factor. The following formula can be used to determine whether the prediction unit is a motion region:

$$pu_{moving} = \begin{cases} 1, & |MV \cdot x| > \theta_{pu-moving} * Thr_{mv \cdot x} \text{ and } |MV \cdot y| > \theta_{pu-moving} * Thr_{mv \cdot y} \\ 0, & \text{otherwise} \end{cases} \quad (9)$$

where MV.x and MV.y are vector values in X-axis direction and Y-axis direction of the motion vector (MV) of the current prediction unit (pu), respectively, $Thr_{mv.x}$ and $Thr_{mv.y}$ are thresholds for determining whether the prediction unit is a motion region, and $\theta_{pu-moving}$ is an adaptive adjustment factor of the motion vector threshold, the initial value of which is 1.

In this way, the total area of the motion area in the mapping block is obtained based on the area of each prediction unit that is determined as the motion area. Specifically:

$$Area_{pu-moving} = \begin{cases} pu \cdot w * pu \cdot h, & pu_{moving} = 1 \\ 0 & \text{otherwise} \end{cases} \quad (10)$$

$$Area_{2N \times 2N-moving} = \sum\nolimits_{i=0}^{m} Area_{pu-moving} \quad (11)$$

where $Area_{pu\text{-}moving}$ is the area of the motion region in the prediction unit, and $Area_{2N\times 2N\text{-}moving}$ is the total area of the motion region in the mapping block. m is the number of prediction unit in the mapping block.

In step S510, it is determined that the mapping block is the motion region of interest when a ratio of the total area of the motion region in the mapping block to the area of the mapping block is greater than a ratio threshold.

A specific formula for calculating the area percentage $Percent_{pu\text{-}moving}$ of the motion region in the mapping block is as follows:

$$\text{percent}_{pu\text{-}moving} = \frac{Area_{2N\times 2N\text{-}moving}}{Area_{2N\times 2N\text{-}block}} \quad (12)$$

where $Area_{2N\times 2N\text{-}block}$ is the total area of the mapping block.

Determining, according to the area ratio of the moving area in the mapping block, whether the mapping block is a region of interest:

$$\text{block} = \begin{cases} \text{region of interest } ROI, & \text{percent}_{pu\text{-}moving} > \beta \\ \text{region of non-interest } NON\text{-}ROI, & \text{otherwise} \end{cases} \quad (13)$$

A better detection effect may be achieved when β is equal to ¾. In other embodiments, β may take on other values. For instance, users may obtain a value of β based on the algorithm and their own encoding instances.

In the above embodiment, the second initialization thresholds are obtained by looking up the table based on the input quantization parameter (Qp) of the current to-be-detected image frame, achieving that different quantization parameters (Qp) index different second initialization thresholds, and the second initialization thresholds can be adaptively adjusted according to the encoding information of the current to-be-detected image frame. This adaptively ensures the correctness of the detection of the region of interest in the current to-be-detected image frame. In addition, detecting the motion region of the current to-be-detected image frame based on the motion vector (MV) information of a coded frame can be achieved by simply caching these data with low algorithmic complexity.

Figure 6:
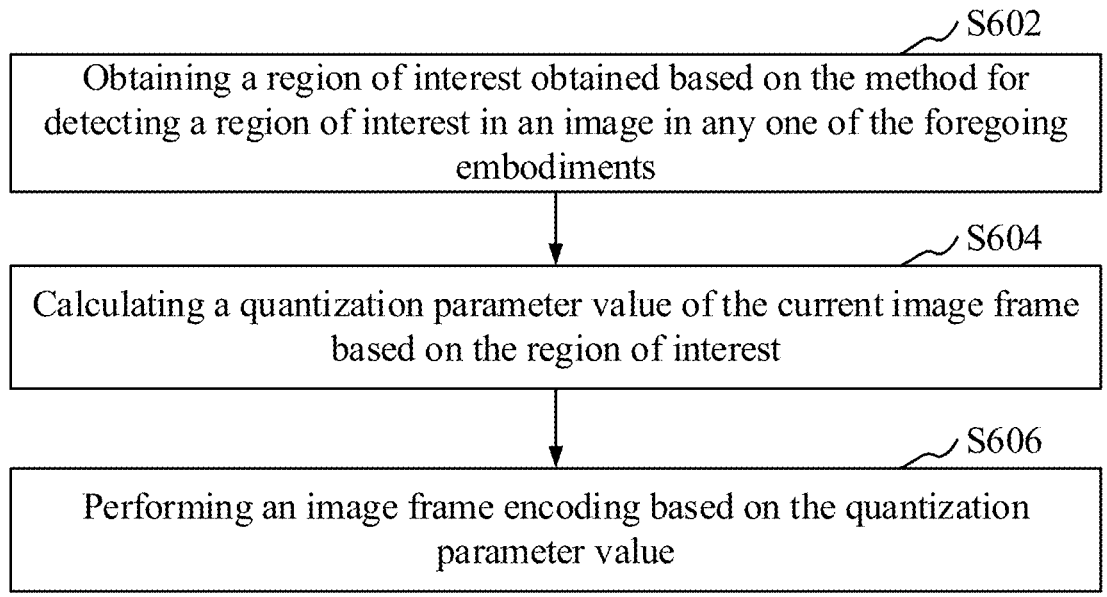
FIG. 6 is a schematic flowchart of a video encoding method according to an embodiment.

In an exemplary embodiment, as shown in FIG. 6, a video encoding method is provided. Taking the implementation with the encoder module as shown in FIG. 1 as an example, the method includes the following steps S602 to S606.

In step S602, a region of interest obtained based on the method for detecting a region of interest in an image in any one of the foregoing embodiments is obtained.

The generation method of the region of interest can be referred to in the foregoing description and will not be repeated herein. In addition, the encoder preprocessing module is configured to identify the region of interest, and as a preprocessing module of the encoder module, it does not affect the normal operation of the encoder module.

In step S604, a quantization parameter value of the current image frame is calculated based on the region of interest.

In step S606, an image frame encoding is performed based on the quantization parameter value.

When video frame encoding is performed by using the region of interest, a quantization parameter value needs to be obtained. The quantization parameter value changes with the variation of the region of interest. Therefore, the region of interest of each current to-be-detected image frame can be obtained, and thus a quantization parameter offset value is calculated. Based on the quantization parameter offset value and the initial quantization parameter value, the quantization parameter value corresponding to a next to-be-detected image frame can be obtained, so as to be used for the image frame encoding.

In the above embodiment, the implementation of the image region of interest detection algorithm in the encoder preprocessing module merely serves as a pre-analysis phase for the formal encoder. The encoder preprocessing module and the formal encoder module are two parallel encoding processes, and the encoder preprocessing module does not affect the encoding performance of the formal encoder (e.g., the encoder module).

It should be understood that, although the steps in the flowcharts involved in the above embodiments are sequentially shown by the indications of the arrows, these steps are not necessarily executed in the order indicated by the arrows. Unless explicitly stated herein, the execution of these steps is not strictly limited to the order, and the steps may be executed in other orders. Moreover, at least a part of the steps in the flowcharts involved in the above embodiments may include multiple steps or multiple stages, and these steps or stages are not necessarily executed and completed at the same time, but may be performed at different times. The execution order of these steps or stages is not necessarily sequential, but may be performed alternately or in turn with other steps or at least a part of the steps or stages of the other steps.

Based on the same inventive concept, the embodiments of the present disclosure also provide an apparatus for detecting a region of interest in an image and a video encoding apparatus for implementing the foregoing involved method for detecting a region of interest in an image and the involved video encoding method, respectively. The solutions for solving the problems provided by the apparatuses are similar to the solutions described in the foregoing methods. Therefore, the specific limitations in the one or more embodiments of the apparatus for detecting a region of interest in an image and the video encoding apparatus can be referred to in the foregoing definition of the method for detecting a region of interest in an image and the video encoding method, which is not repeated herein.

Figure 7:
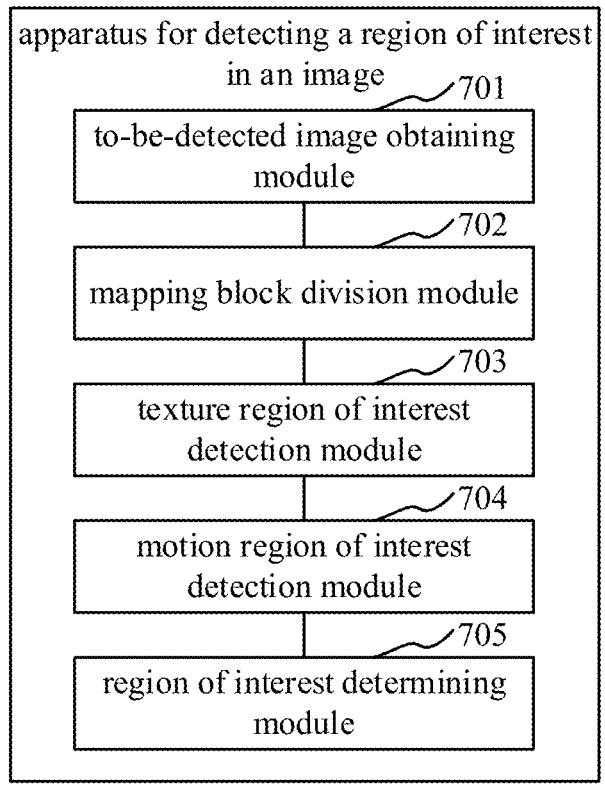
FIG. 7 is a structural block diagram of an apparatus for detecting a region of interest in an image according to an embodiment.

In an exemplary embodiment, as shown in FIG. 7, an apparatus for detecting a region of interest in an image is provided, including a to-be-detected image obtaining module 701, a mapping block division module 702, a texture region of interest detection module 703, a motion region of interest detection module 704, and a region of interest determining module 705.

The to-be-detected image obtaining module 701 is configured to obtain a current to-be-detected image frame.

The mapping block division module 702 is configured to determine a mapping block size parameter value from encoding parameters corresponding to the current to-be-detected image frame, and divide, based on the mapping block size parameter value, the current to-be-detected image frame to obtain multiple mapping blocks.

The texture region of interest detection module 703 is configured to perform a texture region of interest detection on each mapping block to obtain a texture region of interest detection result.

The motion region of interest detection module 704 is configured to perform a motion region of interest detection on each mapping block to obtain a motion region of interest detection result.

The region of interest determining module 705 is configured to determine, based on the texture region of interest detection result and the motion region of interest detection result, a region of interest of the current to-be-detected image frame.

In an embodiment, the texture region of interest detection module 703 is also configured to: divide each mapping block into sub-blocks and determine a size of each sub-block; obtain a first threshold adjustment factor corresponding to the current to-be-detected image frame; obtain a quantization parameter value of the current to-be-detected image frame; determine a first initialization threshold based on the quantization parameter value of the current to-be-detected image frame and the sub-block size; and perform the region of interest detection on the sub-blocks based on the first initialization threshold and the first threshold adjustment factor to obtain the texture region of interest detection result of the mapping block.

In an embodiment, the texture region of interest detection module 703 is also configured to: look up a first mapping relationship table to determine the first initialization threshold corresponding to the quantization parameter value and the sub-block size; and when the first initialization threshold corresponding to the quantization parameter value and the sub-block size is not found in the first mapping relationship table, determine the first initialization threshold corresponding to the quantization parameter value and the sub-block size based on the quantization parameter values and the sub-block sizes in the first mapping relationship table by means of interval mapping.

In an embodiment, the texture region of interest detection module 703 is also configured to: obtain an edge pixel determining threshold based on the first threshold adjustment factor and the first initialization threshold; calculate edge gradient values of pixels in each sub-block; determine an edge pixel determining result of each pixel based on the edge gradient value of the pixel and the edge pixel determining threshold; determine an edge density value of the corresponding sub-block based on each edge pixel determining result; determine the sub-block as the region of interest when the edge density value of which is greater than an edge density threshold; and determine that the mapping block is the region of interest when the mapping block includes at least one sub-block that is the region of interest.

In an embodiment, the texture region of interest detection module 703 is further configured to: obtain a first initialization adjustment factor as the first threshold adjustment factor when the current to-be-detected image frame is the initial frame; and when the current to-be-detected image frame is not the initial frame, obtain the first threshold adjustment factor obtained based on the quantity of the mapping blocks of the region of interest and the quantity of the mapping blocks of the region of non-interest in the texture region of interest detection result of the previous to-be-detected image frame.

In an embodiment, the motion region of interest detection module 704 is also configured to: obtain the quantization parameter value of the current to-be-detected image frame; obtain a second threshold adjustment factor corresponding to the current to-be-detected image frame; determine second initialization thresholds corresponding to different motion vector directions based on the quantization parameter value; perform a motion detection on at least one prediction unit corresponding to each mapping block based on the second initialization thresholds and the second threshold adjustment factor and calculate a total area of the motion region in each mapping block based on a motion detection result of the at least one prediction unit; and determine that the mapping block is the region of interest when a ratio of the total area of the motion region in the mapping block to the area of the mapping block is greater than a ratio threshold.

In an embodiment, the motion region of interest detection module 704 is also configured to: look up a second mapping relationship table to determine the second initialization thresholds of the different motion vector directions corresponding to the quantization parameter value; when the second initialization thresholds of the different motion vector directions corresponding to the quantization parameter value are not found in the second mapping relationship table, determine the second initialization thresholds of the different motion vector directions corresponding to the quantization parameter value based on the quantization parameter values in the second mapping relationship table by means of interval mapping.

In an embodiment, the motion region of interest detection module 704 is also configured to determine, based on the second initialization threshold of the different motion vector directions and the second threshold adjustment factor, a motion vector threshold corresponding to each motion vector direction; obtain the mapping block at the corresponding position in the previous to-be-detected frame of the current to-be-detected image frame; when the different direction motion vectors of the at least one prediction unit included in the obtained mapping block of the previous to-be-detected image frame are all greater than the corresponding motion vector threshold, determine that the mapping block, which has the same position as the at least one prediction unit in the obtained mapping block, of the current to-be-detected image frame is a motion region; and obtain the total area of the motion region in the mapping block based on the area of each prediction unit that is determined as the motion region.

In an embodiment, the notion region of interested detection module 704 is also configured to: obtain a second initialization adjustment factor as the second threshold adjustment factor when the current to-be-detected image frame is a target initial frame; and when the current to-be-detected image frame is not the target initial frame, obtain the second threshold adjustment factor obtained based on a ratio of an area of a motion region in a target to-be-detected image frame to an area of a motion region in the previous to-be-detected image frame, the target to-be-detected image frame being the previous frame of the previous to-be-detected image frame.

In an embodiment, the region of interest determining module 705 is also configured to determine a type of interest and an intensity of interest of each mapping block based on the texture region of interest detection result and the motion region of interest detection result of the mapping block, and obtain the region of interest corresponding to the current to-be-detected image frame based on the type of interest and the intensity of interest of each mapping block.

In an embodiment, the foregoing apparatus also includes an output module configured to output the region of interest corresponding to the current to-be-detected image frame to a quantization parameter value calculation module of a hardware. Alternatively, the region of interest corresponding to the current to-be-detected image frame is output to a target storage area. The region of interest corresponding to the current to-be-detected image frame in the target storage area is transmitted to a hardware encoder through a user interface.

Figure 8:
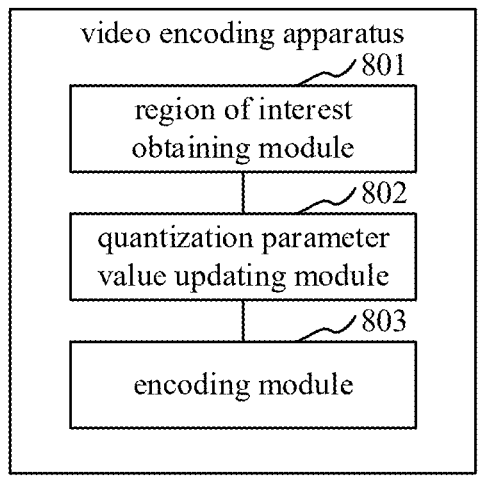
FIG. 8 is a structural block diagram of a video encoding apparatus according to an embodiment.

In an exemplary embodiment, as shown in FIG. 8, a video encoding apparatus is provided, including a region of interest obtaining module 801, a quantization parameter value updating module 802, and an encoding module 803.

The region of interest obtaining module 801 is configured to obtain a region of interest obtained by using the foregoing apparatus for detecting a region of interest in an image.

The quantization parameter value updating module 802 is configured to calculate a quantization parameter value of a current image frame based on the region of interest.

The encoding module 803 is configured to perform image frame encoding based on the quantization parameter value.

The modules in the foregoing apparatus for detecting a region of interest in an image and the video encoding apparatus may be implemented in whole or in part by software, hardware, and a combination thereof. Each of the foregoing modules may be embedded in or independent of a processor in a computer device in a form of hardware, or may be stored in a memory of the computer device in a form of software, so as to be called by the processor to perform the operation corresponding to the foregoing modules.

Figure 9:
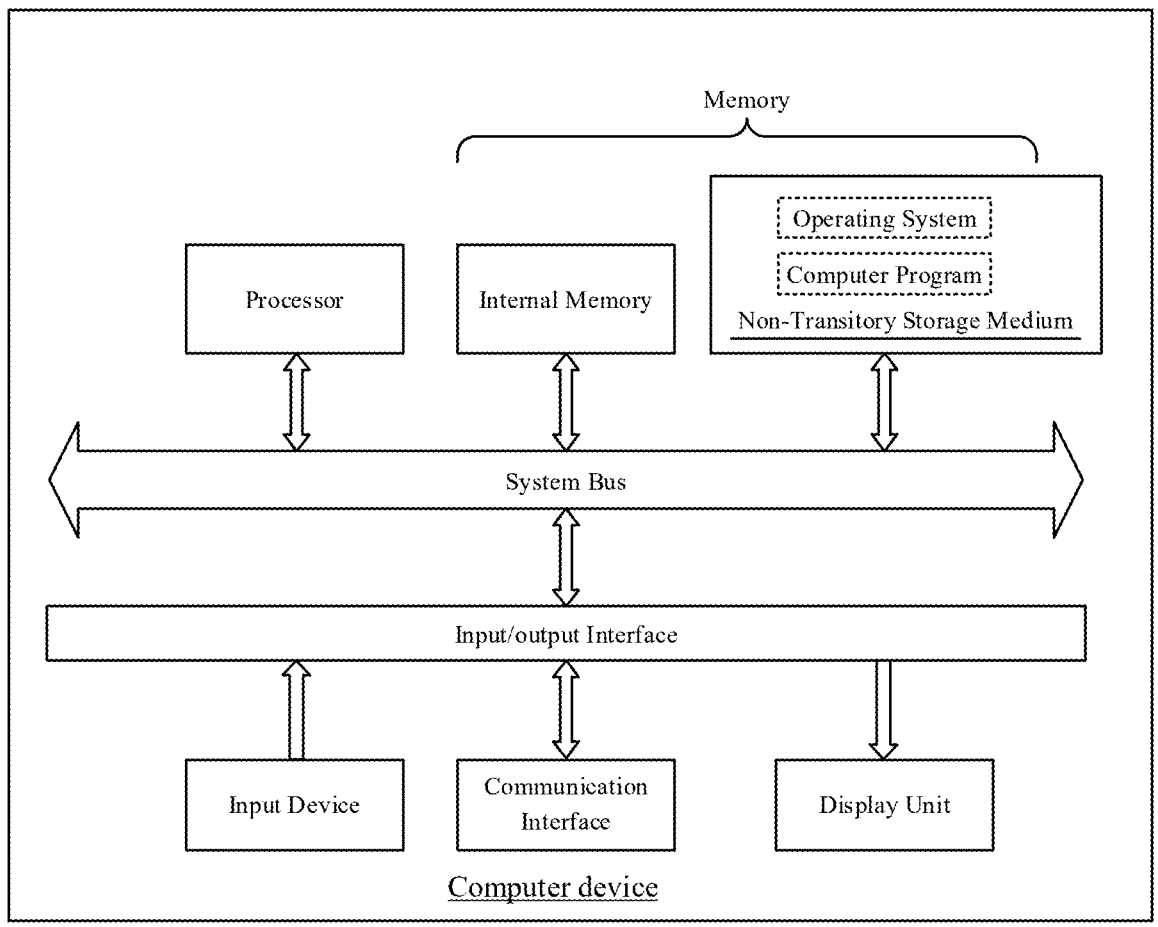
FIG. 9 is a diagram showing an internal structure of a computer device according to an embodiment.

In an exemplary embodiment, a computer device is provided. The computer device may be a terminal, and an internal structure of the computer device is shown in FIG. 9. The computer apparatus includes a processor, a memory, an input/output interface, a communication interface, a display unit, and an input device. The processor, the memory and the input/output interface are connected through a system bus, and the communication interface, the display unit and the input device are connected to the system bus through the input/output interface. The processor of the computer apparatus is configured to provide computing and control capabilities. The memory of the computer apparatus may include a non-transitory storage medium and an internal memory. The non-transitory storage medium stores an operating system and computer programs. The internal memory provides an environment for running the operating system and the computer programs in the non-transitory storage medium. The input/output interface of the computer apparatus is configured to exchange information between the processor and external devices. The communication interface of the computer apparatus is configured to be in wired or wireless communication with external terminals, and the wireless communication can be realized by wireless fidelity (Wi-Fi), mobile cellular network, near field communication (NFC) or other technologies. The computer program can be executed by the processor to implement the method for detecting a region of interest in an image and the video encoding method provided by the above embodiments. The display unit of the computer apparatus is configured to form a visually visible picture. The display unit may be a display screen, a projection device, or a virtual reality imaging device. The display screen may be a liquid crystal display screen or an electronic ink display screen. The input device of the computer apparatus may be a touch layer covered on the display screen, or it may be a key, a trackball, or a touchpad disposed on the housing of the computer apparatus, and may also be an external keyboard, a touchpad, or a mouse.

Those skilled in the art should understand that the structure shown in FIG. 9 is merely a block diagram of a portion of the structure associated with the solutions of the present disclosure, and does not constitute a limitation on the computer device to which the solutions of the present disclosure is applied. A specific computer device may include more or fewer components than those shown in the figure, or combine certain components, or may have different component arrangements.

In an embodiment, a computer device is also provided, which includes a memory and a processor. The memory stores a computer program therein. The processor, when executing the computer program, performs the steps of the methods in the foregoing embodiments.

In an embodiment, a non-transitory computer readable storage medium is provided, in which a computer program is stored. The computer program, when executed by a processor, causes the processor to perform the steps of the methods in the foregoing embodiments.

In an embodiment, a computer program product is provided, which includes a computer program. The computer program, when executed by a processor, causes the processor to perform the steps of the methods in the foregoing embodiments.

Those skilled in the art can understand that all or part of the processes of the methods of the above embodiments can be implemented by instructing relevant hardware through a computer program. The computer program can be stored in a non-transitory computer-readable storage medium, and when executed, perform the processes of the methods in the aforementioned embodiments. Any reference to a memory, a database or other medium used in the embodiments provided in the present disclosure may include at least one of non-transitory memory and transitory memory. The non-transitory memory may include a Read-Only Memory (ROM), a magnetic tape, a floppy disk, a flash memory, an optical memory, a high-density embedded non-transitory memory, a resistive random access memory (ReRAM), a Magnetoresistive Random Access Memory (MRAM), a Ferroelectric Random Access Memory (FRAM), a Phase Change Memory (PCM), or a graphene memory, etc. The transitory memory may include a Random Access Memory (RAM), an external cache memory, or the like. For illustration rather than limitation, the RAM may be in various forms, such as a Static Random Access Memory (SRAM) or a Dynamic Random Access Memory (DRAM). The database involved in the embodiments provided in the present disclosure may include at least one of a relational database or a non-relational database. The non-relational database may include a blockchain-based distributed database, etc., but is not limited thereto. The processors involved in the embodiments provided in present disclosure may be general-purpose processors, central processing units, graphics processors, digital signal processors, programmable logic devices, data processing logic devices based on quantum computing, etc., and is not limited to this.

The technical features in the above embodiments may be randomly combined. For concise description, not all possible combinations of the technical features in the above embodiments are described. However, provided that the combinations of the technical features do not conflict with each other, all combinations of the technical features are considered as falling within the scope recorded in this specification.

The above-mentioned embodiments only illustrate several embodiments of the present disclosure, and the descriptions of which are relatively specific and detailed, but should not be construed as limitations to the scope of the present disclosure. It should be noted that, for those skilled in the art, variations and improvements can be made without departing from the concept of the present disclosure, which all belong to the protection scope of the present disclosure. Therefore, the protection scope of the present disclosure shall be subject to the appended claims.

What is claimed is:

1. A method for detecting a region of interest in an image, comprising:

obtaining a current to-be-detected image frame;
determining a mapping block size parameter value from encoding parameters corresponding to the current to-be-detected image frame, and dividing, based on the mapping block size parameter value, the current to-be-detected image frame to obtain multiple mapping blocks;
performing a texture region of interest detection on each of the mapping blocks to obtain a texture region of interest detection result;
performing a motion region of interest detection on each of the mapping blocks to obtain a motion region of interest detection result; and
determining, based on the texture region of interest detection result and the motion region of interest detection result, a region of interest of the current to-be-detected image frame.

2. The method according to claim 1, wherein performing the texture region of interest detection on each of the mapping blocks to obtain the texture region of interest detection result comprises:
dividing each of the mapping blocks to obtain sub-blocks and determining a sub-block size;
obtaining a first threshold adjustment factor corresponding to the current to-be-detected image frame;
obtaining a quantization parameter value of the current to-be-detected image frame;
determining a first initialization threshold based on the quantization parameter value of the current to-be-detected image frame and the sub-block size; and
performing, based on the first initialization threshold and the first threshold adjustment factor, a region of interest detection on the sub-blocks to obtain the texture region of interest detection result of the mapping block.

3. The method according to claim 2, wherein determining the first initialization threshold based on the quantization parameter value of the current to-be-detected image frame and the sub-block size comprises:
looking up a first mapping relationship table to determine the first initialization threshold corresponding to the quantization parameter value and the sub-block size; and
when the first initialization threshold corresponding to the quantization parameter value and the sub-block size is not found in the first mapping relationship table, determining, based on quantization parameter values and sub-block sizes in the first mapping relationship table, the first initialization threshold corresponding to the quantization parameter value and the sub-block size by means of interval mapping.

4. The method according to claim 2, wherein performing, based on the first initialization threshold and the first threshold adjustment factor, the region of interest detection on the sub-blocks to obtain the texture region of interest detection result of the mapping block comprises:
obtaining an edge pixel determining threshold based on the first threshold adjustment factor and the first initialization threshold;
calculating edge gradient values of pixels in each of the sub-blocks;
determining an edge pixel determining result of each pixel based on the edge gradient value of the pixel and the edge pixel determining threshold;
determining an edge density value of the corresponding sub-block based on each edge pixel determining result, and when the edge density value is greater than an edge density threshold, determining that the sub-block is the region of interest; and
determining that the mapping block is the region of interest when the mapping block comprises at least one sub-block that is determined as the region of interest.

5. The method according to claim 4, wherein obtaining the first threshold adjustment factor corresponding to the current to-be-detected image frame comprises:
obtaining, when the current to-be-detected image frame is an initial frame, a first initialization adjustment factor as the first threshold adjustment factor; and
obtaining, when the current to-be-detected image frame is not the initial frame, the first threshold adjustment factor obtained based on a quantity of mapping blocks of a region of interest and a quantity of mapping blocks of a region of non-interest in a texture region of interest detection result of a previous to-be-detected image frame.

6. The method according to claim 4, wherein the edge gradient values of the pixels are calculated based on a Sobel edge detection.

7. The method according to claim 1, wherein performing the motion region of interest detection on each of the mapping blocks to obtain the motion region of interest detection result of the mapping block comprises:
obtaining a quantization parameter value of the current to-be-detected image frame;
obtaining a second threshold adjustment factor corresponding to the current to-be-detected image frame;
determining, based on the quantization parameter value, second initialization thresholds of different motion vector directions;
performing, based on the second initialization thresholds and the second threshold adjustment factor, a motion detection on at least one prediction unit corresponding to each mapping block, and calculating a total area of a motion region in each mapping block based on a motion detection result of the at least one prediction unit; and
determining that the mapping block is the region of interest when a ratio of the total area of the motion region in the mapping block to an area of the mapping block is greater than a ratio threshold.

8. The method according to claim 7, wherein determining, based on the quantization parameter value, the second initialization thresholds of the different motion vector directions comprises:
looking up a second mapping relationship table to determine the second initialization thresholds of the different motion vector directions corresponding to the quantization parameter value; and
when the second initialization thresholds of the different motion vector directions corresponding to the quantization parameter value are not found in the second mapping relationship table, determining, based on quantization parameter values in the second mapping table, the second initialization threshold of the different motion vector directions corresponding to the quantization parameter value by means of interval mapping.

9. The method according to claim 7, wherein performing, based on the second initialization thresholds and the second threshold adjustment factor, the motion detection on the at least one prediction unit corresponding to each mapping block, and calculating the total area of the motion region in each mapping block based on the motion detection result of the at least one prediction unit comprises:

determining, based on the second initialization thresholds of different motion vector directions and the second threshold adjustment factor, a motion vector threshold corresponding to each of the different motion vector directions;

obtaining a mapping block at a corresponding position in the previous frame of the current to-be-detected image frame;

when different direction motion vectors of at least one prediction unit included in the obtained mapping block of the previous to-be-detected image frame are all greater than the corresponding motion vector thresholds, determining that the mapping block, which has the same position as the at least one prediction unit in the obtained mapping block, of the current to-be-detected image is a motion region; and obtain the total area of the motion region in the mapping block based on the area of each prediction unit that is determined as the motion region.

10. The method according to claim 7, wherein obtaining the second threshold adjustment factor corresponding to the current to-be-detected image frame comprises:

when the current to-be-detected image frame is a target initial frame, obtaining a second initialization adjustment factor as the second threshold adjustment factor; and when the current to-be-detected image frame is not the target initial frame, obtaining a second threshold adjustment factor obtained based on a ratio of an area of a motion region in a target to-be-detected image frame to an area of a motion region in the previous to-be-detected image frame, wherein the target to-be-detected image frame is the previous frame of the previous to-be-detected image frame.

11. The method according to claim 1, wherein determining, based on the texture region detection result and the motion region detection result, the region of interest of the current to-be-detected image frame comprises:

determining a type of interest and an intensity of interest of each mapping block based on the texture region of interest detection result and the motion region of interest detection result of the mapping block; and obtaining the region of interest of the current to-be-detected image frame based on the type of interest and the intensity of interest of each mapping block.

12. The method according to claim 11, the type of interest comprising four types, and different types of interest corresponding to different intensities of interest, wherein, the type of the interest of the mapping block is a first type when both the texture region of interest detection result and the motion region of interest detection result indicate that the mapping block is the region of interest;

the type of interest of the mapping block is a second type when both the texture region of interest detection result and the motion region of interest detection result indicate that the mapping block is not the region of interest;

the type of interest of the mapping block is a third type when the texture region of interest detection result indicates that a mapping block is the region of interest and the motion region of interest detection result indicates that the mapping block is not the region of interest; and the type of the interest of the mapping block is a fourth type when the texture region of interest detection result indicates that a mapping block is not the region of interest and the motion region of interest detection result indicates that the mapping block is the region of interest.

13. The method according to claim 1, wherein the method further comprises:

outputting the region of interest of the current to-be-detected image frame to a quantization parameter value calculation module of a hardware; or outputting the region of interest of the current to-be-detected image frame to a target storage area, and the region of interest of the current to-be-detected image frame in the target storage area is transmitted to a hardware encoder through a user interface.

14. A video encoding method, comprising:

obtaining a region of interest obtained based on the method for detecting a region of interest in an image according to claim 1;

calculating, based on the region of interest, a quantization parameter value of a current image frame; and performing an image frame encoding based on the quantization parameter value.

15. An apparatus for detecting a region of interest in an image, comprising:

a to-be-detected image obtaining module configured to obtain a current to-be-detected image frame;

a mapping block division module configured to determine a mapping block size parameter value from encoding parameters corresponding to the current to-be-detected image frame and divide, based on the mapping block size parameter value, the current to-be-detected image frame to obtain multiple mapping blocks;

a texture region of interest detection module configured to perform a texture region of interest detection on each mapping block to obtain a texture region of interest detection result;

a motion region of interest detection module configured to perform a motion region of interest detection on each mapping block to obtain a motion region of interest detection result; and a region of interest determining module configured to determine a region of interest of the current to-be-detected image frame based on the texture region of interest detection result and the motion region of interest detection result.

16. A video encoding apparatus, comprising:

a region of interest obtaining module configured to obtain a region of interest obtained by using the apparatus for detecting a region of interest in an image according to claim 13;

a quantization parameter value updating module configured to calculate a quantization parameter value of a current image frame based on the region of interest; and an encoding module configured to perform an image frame encoding based on the quantization parameter value.

17. A computer device, comprising a memory and a processor, wherein the memory stores a computer program therein, and the processor, when executing the computer program, performs steps of the method according to claim 1.

18. A non-transitory computer readable storage medium, in which a computer program is stored, wherein the computer program, when executed by a processor, causes the processor to perform steps of the method according to claim 1.

19. A computer program product comprising a computer program, wherein the computer program, when executed by a processor, causes the processor to perform steps of the method according to claim 1.

20. An encoder comprising an encoder preprocessing module and an encoder module, wherein the method for detecting a region of interest in an image according to claim 1 is performed in the encoder preprocessing module, the encoder module performs image frame encoding, and the encoder module runs in parallel with the encoder preprocessing module.

* * * * *